(12) United States Patent
Ueno et al.

(10) Patent No.: US 9,050,970 B2
(45) Date of Patent: Jun. 9, 2015

(54) DRIVING TORQUE CONTROL DEVICE FOR HYBRID VEHICLE

(75) Inventors: Munetoshi Ueno, Atsugi (JP); Takeshi Ohno, Yamato (JP); Noboru Kudo, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 83 days.

(21) Appl. No.: 13/881,464

(22) PCT Filed: Oct. 25, 2011

(86) PCT No.: PCT/JP2011/074524
§ 371 (c)(1),
(2), (4) Date: Apr. 25, 2013

(87) PCT Pub. No.: WO2012/057118
PCT Pub. Date: May 3, 2012

(65) Prior Publication Data
US 2013/0226385 A1 Aug. 29, 2013

(30) Foreign Application Priority Data
Oct. 26, 2010 (JP) ................................. 2010-239383

(51) Int. Cl.
*B60L 9/00* (2006.01)
*B60L 1/00* (2006.01)
(Continued)

(52) U.S. Cl.
CPC ............... *B60W 20/10* (2013.01); *B60L 11/14* (2013.01); *B60L 15/20* (2013.01); *B60L 2240/12* (2013.01); *B60L 2240/423* (2013.01);
(Continued)

(58) Field of Classification Search
CPC ................... B60W 2050/0042; B60W 20/00; B60W 10/06; B60W 20/40; B60W 2710/083; Y02T 10/6221; Y02T 10/56; Y02T 10/7077; Y02T 10/7005; B60L 2240/486; B60L 11/14; B60L 15/20; B60L 2240/80; B60L 7/14
USPC ......... 701/54, 79, 60, 51, 22, 70; 180/65.265, 180/56.28, 176; 903/903, 930
See application file for complete search history.

(56) References Cited

U.S. PATENT DOCUMENTS 7,599,780 B2 * 10/2009 Whitney et al. ............... 701/102
7,935,021 B2 * 5/2011 Tabata et al. ...................... 477/5
(Continued)

FOREIGN PATENT DOCUMENTS

| JP | 10-23609 A | 1/1998 |
|---|---|---|
| JP | 2001-268714 A | 9/2001 |
| JP | 2007-198157 A | 8/2007 |

*Primary Examiner* — Calvin Cheung
*Assistant Examiner* — Luis A Martinez Borrero
(74) *Attorney, Agent, or Firm* — Foley & Lardner LLP

(57) ABSTRACT

A driving torque control device for a hybrid vehicle has an engine torque estimation unit configured to estimate an engine torque by compensating for a retardation caused by a delay filter in an engine torque instruction value, and a retardation factor selection unit configured to select, as a retardation factor indicating a retardation degree of the delay filter, any one of an increase-side retardation factor for a case where the engine torque instruction value increases and a decrease-side retardation factor for a case where the engine torque instruction value decreases. The retardation factor selection unit performs switching between the increase-side retardation factor and the decrease-side retardation factor in a case where a difference between the engine torque estimation value and the engine torque instruction value as a filter input value is equal to or smaller than a predetermined value.

6 Claims, 18 Drawing Sheets

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2006.01) |
| *B60L 11/14* | (2006.01) |
| *B60L 15/20* | (2006.01) |
| *B60W 50/00* | (2006.01) |
| *B60K 6/48* | (2007.10) |
| *B60L 7/14* | (2006.01) |
| *B60L 7/26* | (2006.01) |

(52) U.S. Cl.
CPC ....... *B60L 2240/443* (2013.01); *B60L 2240/80* (2013.01); *Y02T 10/642* (2013.01); *Y02T 10/7077* (2013.01); *Y10S 903/903* (2013.01); B60W 50/0098 (2013.01); B60K 6/48 (2013.01); *B60W 2050/0042* (2013.01); *B60W 2510/0657* (2013.01); *B60W 2540/10* (2013.01); B60W 20/40 (2013.01); B60L 7/14 (2013.01); B60L 7/26 (2013.01); B60L 15/2009 (2013.01); *B60L 2210/40* (2013.01); *B60L 2240/421* (2013.01); *B60L 2240/441* (2013.01); *B60L 2240/486* (2013.01); *B60L 2240/507* (2013.01); *B60L 2260/44* (2013.01); *B60L 2270/145* (2013.01); *Y02T 10/6221* (2013.01); *Y02T 10/7241* (2013.01); *B60K 2006/4825* (2013.01); *Y02T 10/6252* (2013.01); *Y02T 10/7275* (2013.01); *Y02T 10/70* (2013.01)

(56) References Cited

U.S. PATENT DOCUMENTS

| | | | | |
|---|---|---|---|---|
| 8,157,035 | B2* | 4/2012 | Whitney et al. | 180/65.265 |
| 8,172,018 | B2* | 5/2012 | Suzuki | 180/65.285 |
| 2002/0050269 | A1* | 5/2002 | Osanai | 123/339.11 |
| 2004/0251862 | A1* | 12/2004 | Imai | 318/376 |
| 2005/0065690 | A1* | 3/2005 | Ashizawa et al. | 701/51 |
| 2005/0080535 | A1* | 4/2005 | Steinmetz et al. | 701/51 |
| 2005/0252283 | A1* | 11/2005 | Heap et al. | 73/118.1 |
| 2007/0125083 | A1* | 6/2007 | Rollinger et al. | 60/605.1 |
| 2008/0099259 | A1* | 5/2008 | Tomo | 180/65.2 |
| 2009/0005216 | A1* | 1/2009 | Whitney et al. | 477/107 |
| 2009/0037066 | A1* | 2/2009 | Kuwahara et al. | 701/84 |
| 2009/0118937 | A1* | 5/2009 | Heap et al. | 701/54 |
| 2009/0314565 | A1* | 12/2009 | Suzuki | 180/65.285 |
| 2010/0038158 | A1* | 2/2010 | Whitney et al. | 180/65.265 |
| 2010/0121515 | A1* | 5/2010 | Izumi | 701/22 |
| 2010/0282532 | A1* | 11/2010 | Falkenstein | 180/65.265 |
| 2011/0004364 | A1* | 1/2011 | Sawada et al. | 701/22 |
| 2011/0005212 | A1* | 1/2011 | Matsushita et al. | 60/299 |
| 2011/0144885 | A1* | 6/2011 | Ohtsuka et al. | 701/102 |

\* cited by examiner

INCREASE-SIDE FACTOR a

| | SMALL← ENGINE TORQUE INSTRUCTION VALUE →LARGE | | | |
|---|---|---|---|---|
| ENGINE ROTATIONAL SPEED HIGH←  →LOW | 0.02 | 0.01 | 0.01 | 0.01 |
| | 0.02 | 0.01 | 0.01 | 0.01 |
| | 0.01 | 0.01 | 0.01 | 0.01 |
| | 0.01 | 0.01 | 0.01 | 0.01 |
| | 0.01 | 0.01 | 0.01 | 0.01 |

*FIG.12A*

INCREASE-SIDE FACTOR b

| | SMALL← ENGINE TORQUE INSTRUCTION VALUE →LARGE | | | |
|---|---|---|---|---|
| ENGINE ROTATIONAL SPEED HIGH←  →LOW | 0.35 | 0.15 | 0.1 | 0.08 |
| | 0.28 | 0.15 | 0.1 | 0.08 |
| | 0.13 | 0.08 | 0.08 | 0.08 |
| | 0.13 | 0.08 | 0.08 | 0.08 |
| | 0.13 | 0.08 | 0.08 | 0.08 |

*FIG.12B*

DECREASE-SIDE FACTOR a'

| LOW← ENGINE ROTATIONAL SPEED →HIGH | | | |
|---|---|---|---|
| 0.01 | 0.008 | 0.008 | 0.005 |

*FIG.12C*

DECREASE-SIDE FACTOR b'

| LOW← ENGINE ROTATIONAL SPEED →HIGH | | | |
|---|---|---|---|
| 0.46 | 0.26 | 0.16 | 0.14 |

*FIG.12D*

DRIVING TORQUE CONTROL DEVICE FOR HYBRID VEHICLE

TECHNICAL FIELD

The present invention relates to a driving force control device for a hybrid vehicle having an electric vehicle (EV) mode in which a vehicle travels using only power from a motor/generator and a hybrid electric vehicle (HEV) mode in which a vehicle can travel using power from both an engine and a motor/generator.

BACKGROUND ART

In related art, there is proposed a driving torque control device for a hybrid vehicle configured to achieve a driver request driving force by compensating for a transient output power fluctuation of the engine with a motor torque (refer to JP2001-268714A). In this control device, a target driving torque is computed based on an accelerator pedaling amount and a vehicle speed, and a torque to be generated by the motor is computed based on a battery charge state, so that the engine is controlled by using the target driving torque and a torque value for obtaining the torque to be generated as a target engine torque. In addition, the motor is controlled by using a difference between the target driving torque and the engine torque estimation value as a target motor torque. As a result, steadily, it is possible to achieve a desired power generation amount to satisfy a battery charge state. In addition, transiently, it is possible to achieve a driver request driving force to perform rapid acceleration/deceleration.

SUMMARY OF THE INVENTION

In related art, there are proposed engine torque estimation methods such as a method of estimating the engine torque based on a relationship map between an engine rotational speed and a throttle opening, a method of estimating the engine torque in a real-time manner by detecting a cylinder internal pressure of the engine, and a method of estimating the engine torque based on an intake air amount of the engine and the engine rotational speed. However, in the method of estimating the engine torque using a sensor or the like as described above, it is necessary to employ a complicated control scheme in preparation for sensor abnormality. As a result, the number of development processes significantly increases.

Although there is proposed an estimation method by compensating for a retardation as in the example of related art described above, an engine torque response changes depending on a rotational speed condition, a torque change amount from the initial torque, and the torque fluctuation. Therefore, estimation accuracy of the engine torque is low if the retardation compensation is simply applied.

In order to achieve the above object, this invention provides a driving torque control device for a hybrid vehicle suitable for improvement of control accuracy of a vehicle driving torque by improving estimation accuracy of an engine torque.

A driving torque control device for a hybrid vehicle according to the present invention is applied to a hybrid vehicle having an engine and a motor/generator as a power source and capable of selecting an electric vehicle mode in which a vehicle travels only using power from the motor/generator or a hybrid electric vehicle mode in which a vehicle travels using power from both the engine and the motor/generator, to determine a driving force based on information corresponding to a driver request load and perform switching between the electric vehicle mode and the hybrid electric vehicle mode. The driving torque control device includes: an engine torque estimation unit configured to estimate an engine torque by compensating for a retardation caused by a delay filter in the engine torque instruction value; and a retardation factor selection unit configured to select, as a retardation factor indicating a retardation degree of the delay filter, any one of an increase-side retardation factor for a case where the engine torque instruction value increases and a decrease-side retardation factor for a case where the engine torque instruction value decreases. The retardation factor selection unit performs switching between the increase-side retardation factor and the decrease-side retardation factor in a case where a difference between the engine torque estimation value and the engine torque instruction value as a filter input value is equal to or smaller than a predetermined value.

The foregoing and additional features and characteristics of this disclosure will become more apparent from the following detailed description considered with the reference to the accompanying drawings.

BRIEF DESCRIPTION OF THE DRAWINGS

FIG. 12A is a map of an increase-side factor a selected when the engine torque instruction value increases;

FIG. 12B is a map of an increase-side factor b selected when the engine torque instruction value increases;

FIG. 12C is a map of a decrease-side factor a' selected when the engine torque instruction value decreases;

FIG. 12D is a map of a decrease-side factor b' selected when the engine torque instruction value decreases;

DESCRIPTION OF THE EMBODIMENTS

Hereinafter, a driving torque control device for a hybrid vehicle according to an embodiment of the present invention will be described with reference to the accompanying drawings.

Figure 1:
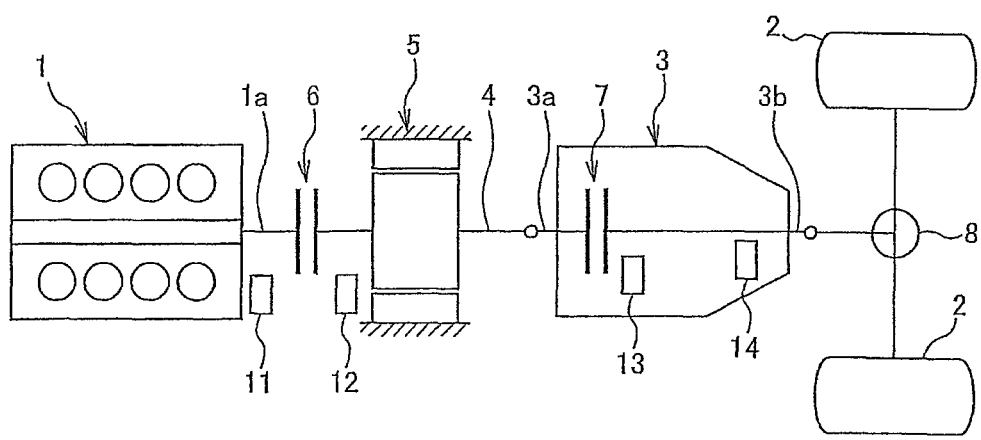
FIG. 1 is a schematic plan view illustrating a power train of a hybrid vehicle where the concept of the present invention can be applied.

FIG. 1 is a diagram illustrating a power train of a hybrid vehicle where the driving torque control device of a hybrid vehicle according to the present invention can be applied. This hybrid vehicle is based on a front-engine/rear-wheel drive vehicle (rear-wheel drive vehicle). In FIG. 1, the numeral 1 indicates an engine as a first power source, and the numeral 2 indicates a drive wheel (rear wheel).

Similar to a typical rear-wheel drive vehicle, in the power train of the hybrid vehicle of FIG. 1, an automatic transmission 3 is placed in tandem in a rear side of the engine 1, that is, in a rear side along an anteroposterior direction. In addition, a motor/generator 5 is combined with a shaft 4 configured to transmit rotation from the engine 1 (crankshaft 1a) to an input shaft 3a of the automatic transmission 3. The motor/generator 5 is used as a second power source.

The motor/generator 5 serving as either a drive motor (electric motor) or a generator (electric power generator) is placed between the engine 1 and the automatic transmission 3. A first clutch 6 is interposed between the motor/generator 5 and the engine 1, and more specifically, between the shaft 4 and the engine crankshaft 1a, so that the engine 1 and the motor/generator 5 are separably combined with each other through the first clutch 6. Here, a transfer torque capacity of the first clutch 6 can change continuously or stepwise. For example, the first clutch 6 may be a wet-type multi-plate clutch capable of changing a transfer torque capacity by controlling a clutch hydraulic fluid flow and a clutch hydraulic pressure continuously or stepwise using a proportional solenoid.

A second clutch 7 is interposed between the motor/generator 5 and the drive wheel (rear wheel) 2. The motor/generator 5 and the drive wheel (rear wheel) 2 are separably combined with each other through the second clutch 7. Similar to the first clutch 6, a transfer torque capacity of the second clutch 7 can change continuously or stepwise. For example, the second clutch 7 may be a wet-type multi-plate clutch capable of changing a transfer torque capacity by controlling a clutch hydraulic fluid flow and a clutch hydraulic pressure continuously or stepwise using a proportional solenoid.

The automatic transmission 3 may be any one well known in the art. A power transmission path (gear position) is determined based on a combination of engagement and release of a plurality of frictional elements (such as a clutch or a brake) by selectively engaging or releasing such frictional elements. Therefore, the automatic transmission 3 performs a gearshift for rotation from the input shaft 3a depending on a gear ratio corresponding to the selected gear position and outputs the rotation to the output shaft 3b. This output rotation is distributed and transmitted to the left and right rear-wheels 2 through a differential gear unit 8 and is provided for a vehicle drive. Although the aforementioned description relates to a gearshift type transmission, the invention is not limited thereto. Needless to say, the invention may also be applicable to a continuously variable transmission (CVT).

According to the present embodiment, the second clutch 7 that separably combines the motor/generator 5 and the drive wheel 2 is not provided as a new dedicated element. Instead, the second clutch 7 is implemented by applying a transmission frictional element existing in the automatic transmission 3 (refer to FIG. 1). In this case, through the engagement of the second clutch 7, the gear position selection functionality (transmission functionality) described above is obtained to set the automatic transmission 3 in a power transfer state, and a mode selection functionality described below can be obtained by cooperatively releasing or engaging the first clutch 6. As a result, it is not necessary to use a dedicated element as the second clutch, which is remarkably advantageous in cost.

Figure 20A:
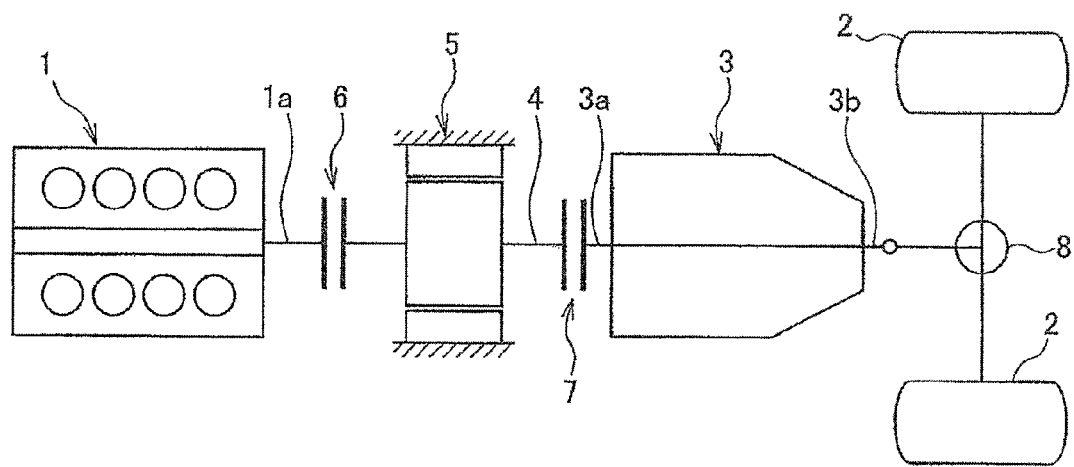
FIG. 20A is a schematic plan view illustrating an exemplary power train of a hybrid vehicle in which arrangement of a second clutch is modified.
Figure 20B:
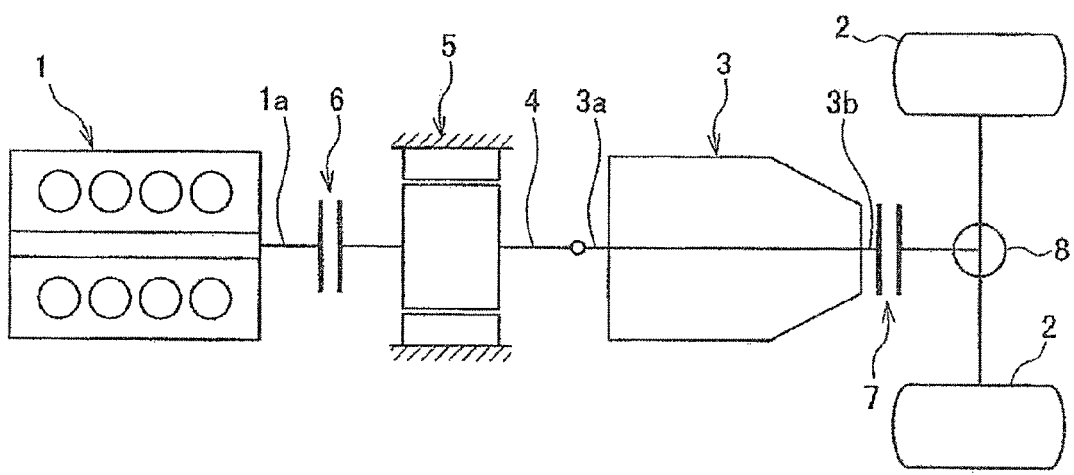
FIG. 20B is a schematic plan view illustrating another exemplary power train of a hybrid vehicle in which arrangement of a second clutch is modified.

A new dedicated element may be provided as the second clutch 7. In this case, as illustrated in FIG. 20A, the second clutch 7 may be provided between the input shaft 3a of the automatic transmission 3 and the shaft 4 of the motor/generator. In addition, as illustrated in FIG. 20B, the second clutch 7 may be provided between the output shaft 3b of the automatic transmission 3 and a rear-wheel drive system.

In the power train of the hybrid vehicle of FIG. 1, in a case where it is necessary to operate in an electric vehicle (EV) mode used in a low load and a low vehicle speed such as a case where a vehicle starts from a stop state, the first clutch 6 is released, and the second clutch 7 is engaged to put the automatic transmission 3 into a power transfer state. In addition, the second clutch 7 is a transmission frictional element to be engaged in the present gear position out of transmission frictional elements in the automatic transmission 3 and is different depending on the selected gear position.

If the motor/generator 5 is driven in this state, only the output rotation from the motor/generator 5 is transferred to the transmission input shaft 3a. The automatic transmission 3 performs a gearshift for the rotation to the input shaft 3a depending on a selected gear position and outputs the rotation from the transmission output shaft 3b. Then, the rotation from the transmission output shaft 3b is transferred to the rear wheel 2 through the differential gear unit 8. Therefore, it is possible to cause a vehicle to travel in an electric vehicle (EV) mode only using the motor/generator 5.

In a case where it is necessary to operate in a hybrid electric vehicle (HEV) mode used in a high-speed, a heavy load, and the like, the first clutch 6 is also engaged while the second clutch 7 is engaged to cause the automatic transmission 3 to have a corresponding gear position selection state (power transfer state). In this state, both the output rotation from the engine 1 and the output rotation from the motor/generator 5 are transferred to the transmission input shaft 3a. The automatic transmission 3 performs a gearshift for the rotation to the input shaft 3a depending on the selected gear position and outputs the rotation from the transmission output shaft 3b. Then, the rotation from the transmission output shaft 3b is transferred to the rear wheel 2 through the differential gear unit 8, and it is possible to cause a vehicle to travel in a hybrid electric vehicle (HEV) mode using both the engine 1 and the motor/generator 5.

During the drive in such an HEV mode, in a case where there is surplus energy if the engine 1 is driven at an optimal fuel consumption, this surplus energy may be converted into electrical power by operating the motor/generator 5 as a generator. In addition, the generated power may be stored for use in the motor driving of the motor/generator 5, so that it is possible to improve a fuel consumption of the engine 1.

Figure 2:
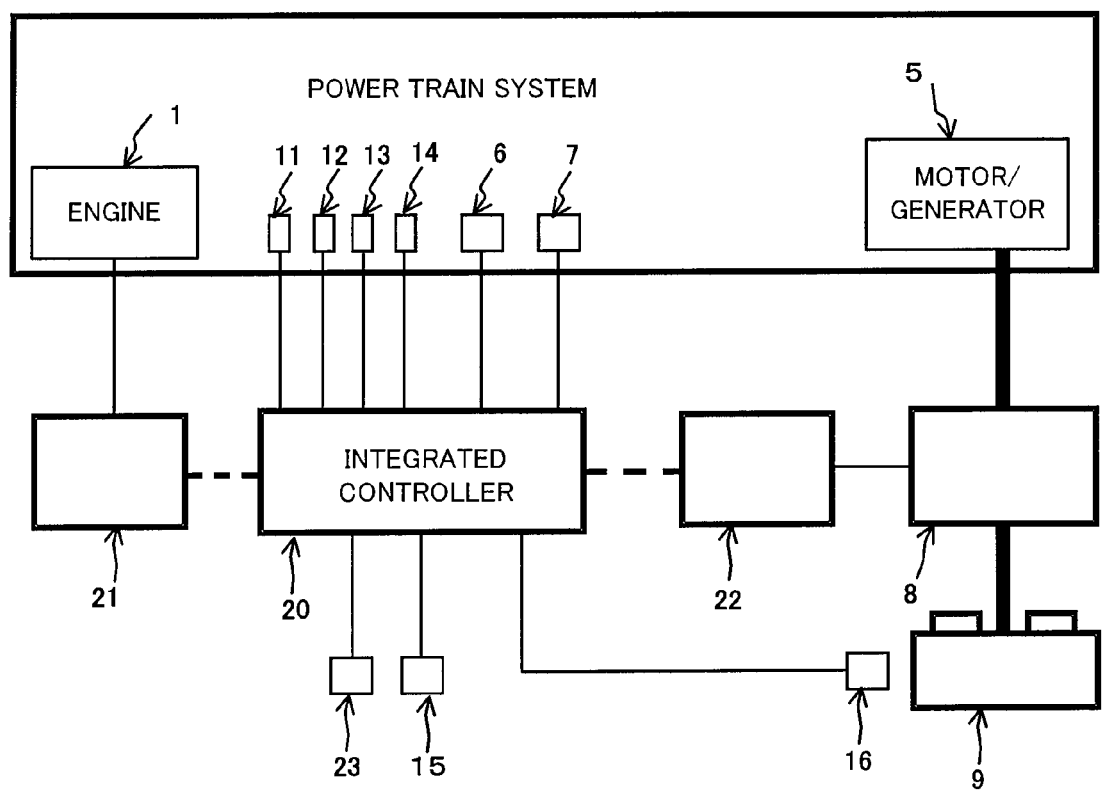
FIG. 2 is a block diagram illustrating a power train control system.

The engine 1, the motor/generator 5, and the first and second clutches 6 and 7 included in the power train of the hybrid vehicle of FIG. 1 are controlled using the system illustrated in FIG. 2. The control system of FIG. 2 has an integrated controller 20 that integratedly controls an operational point of the power train. The operational point of the power train is defined based on a target engine torque, a target motor/generator torque (also referred to as a target motor/generator rotational speed), a target transfer torque capacity of the first clutch 6, and a target transfer torque capacity of the second clutch 7.

In order to determine the operational point of the power train described above, the integrated controller 20 receives signals as described below. The input signals include a signal from an engine rotation sensor 11 that detects an engine rotational speed, a signal from a motor/generator rotation sensor 12 that detects a motor/generator rotational speed, and a signal from an input rotation sensor 13 that detects a transmission input rotational speed. In addition, the integrated controller 20 receives a signal from an output rotation sensor 14 that detects a transmission output rotational speed and a signal from an accelerator pedal opening sensor 15 (driving load detection means) that detects an accelerator pedaling amount (accelerator pedal opening APO) indicating a desired load state of a vehicle. Furthermore, the integrated controller 20 receives a signal from a brake pressure sensor 23 that detects a brake hydraulic pressure (BPS) and a signal from a charge state sensor 16 that detects a state of charge (SOC) (or available electric power) in the battery 9 which stores electric power for the motor/generator 5.

Out of the sensors described above, the engine rotation sensor 11, the motor/generator rotation sensor 12, the input rotation sensor 13, and the output rotation sensor 14 may be arranged as illustrated in FIG. 1.

The integrated controller 20 selects a driving mode (EV mode or HEV mode) capable of implementing a vehicle drive force desired by a driver based on the accelerator pedal opening (APO), the battery charge state (SOC), and the transmission output rotational speed (vehicle speed VSP) out of the input information described above. In addition, the integrated controller 20 computes the target engine torque, the target motor/generator torque (also referred to as a target motor/generator rotational speed), the target first-clutch transfer torque capacity, and the target second-clutch transfer torque capacity based on the accelerator pedal opening (APO), the battery charge state (SOC), and the transmission output rotational speed (vehicle speed VSP). The target engine torque is supplied to an engine controller 21, and the target motor/generator torque (also referred to as a target motor/generator rotational speed) is supplied to a motor/generator controller 22.

The engine controller 21 controls the engine 1 such that the engine torque becomes the target engine torque. The motor/generator controller 22 controls the motor/generator 5 using the battery 9 and the inverter 10 such that the torque (or rotational speed) of the motor/generator 5 becomes the target motor/generator torque (or target motor/generator rotational speed).

The integrated controller 20 supplies the solenoid current corresponding to the target first-clutch transfer torque capacity and the target second-clutch transfer torque capacity to engagement control solenoids (not illustrated) of the first and second clutches 6 and 7. In addition, the integrated controller 20 controls engagement forces of the first and second clutches 6 and 7 respectively such that the transfer torque capacity of the first clutch 6 matches the target transfer torque capacity, and the transfer torque capacity of the second clutch 7 matches the target second-clutch transfer torque capacity.

Figure 3:
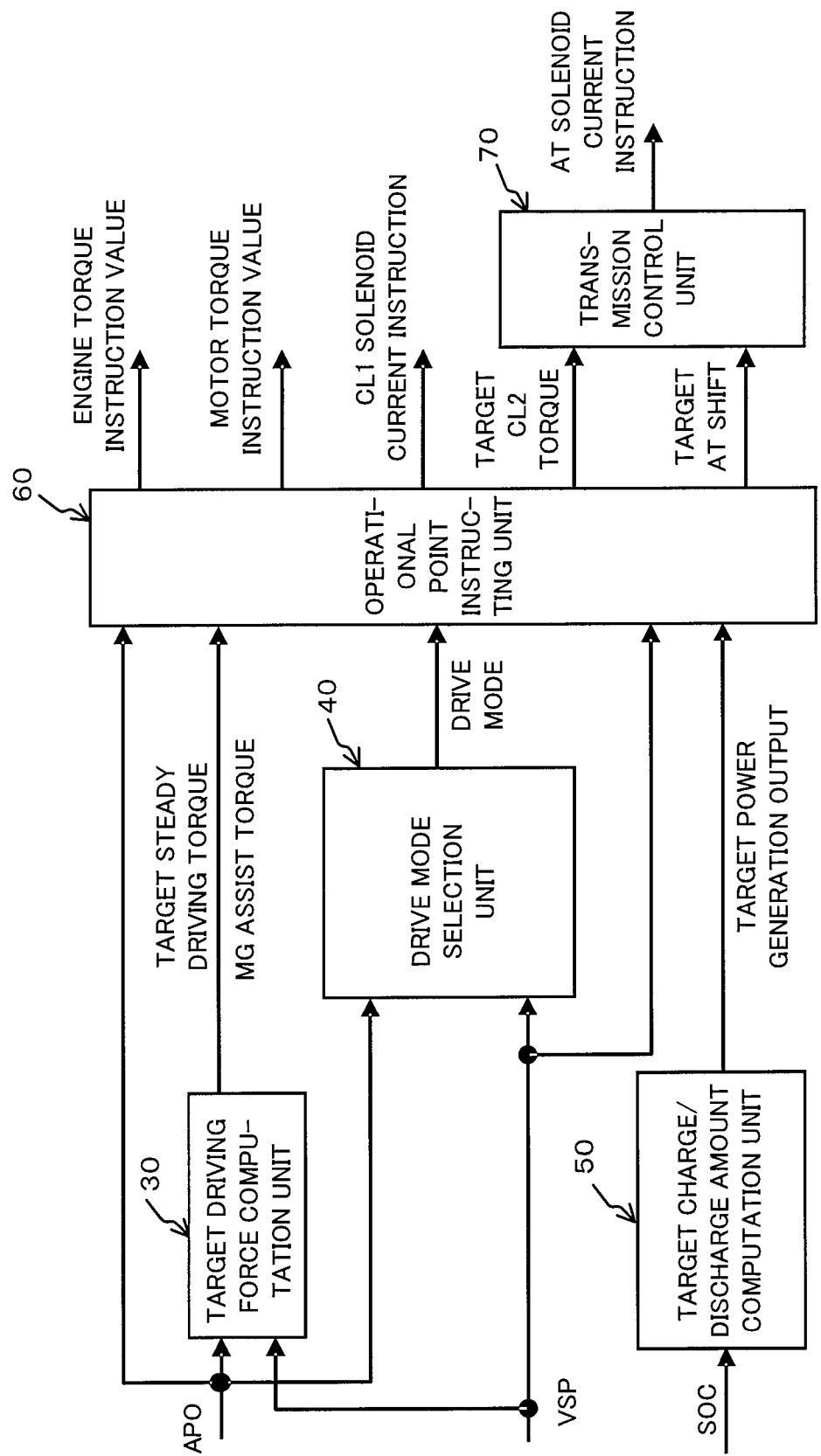
FIG. 3 is a functional block diagram illustrating an integrated controller in a control system.

FIG. 3 is a functional block diagram illustrating the integrated controller 20. The integrated controller 20 selects the drive mode (EV mode or HEV mode) described above and computes the target engine torque, the target motor/generator torque, the target first-clutch transfer torque capacity, and the target second-clutch transfer torque capacity as illustrated in the functional block diagram of FIG. 3.

Figure 4:
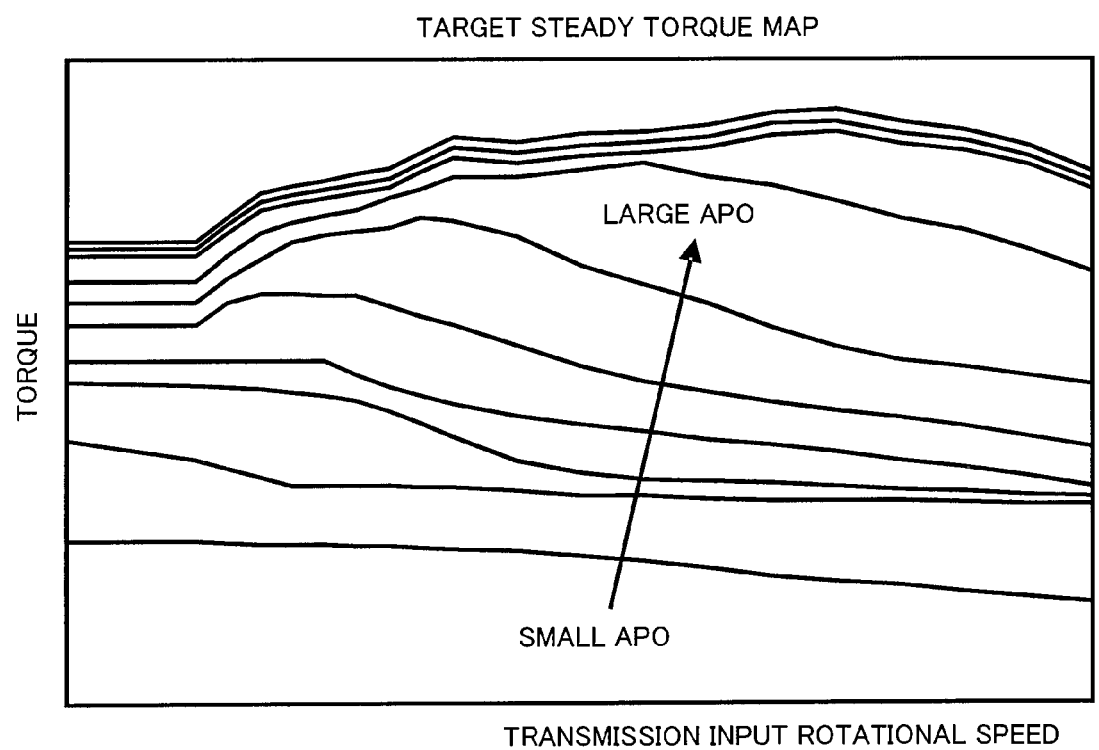
FIG. 4 is a graph illustrating a characteristic of a target driving force used when a target drive force computation unit obtains the target driving force.
Figure 5:
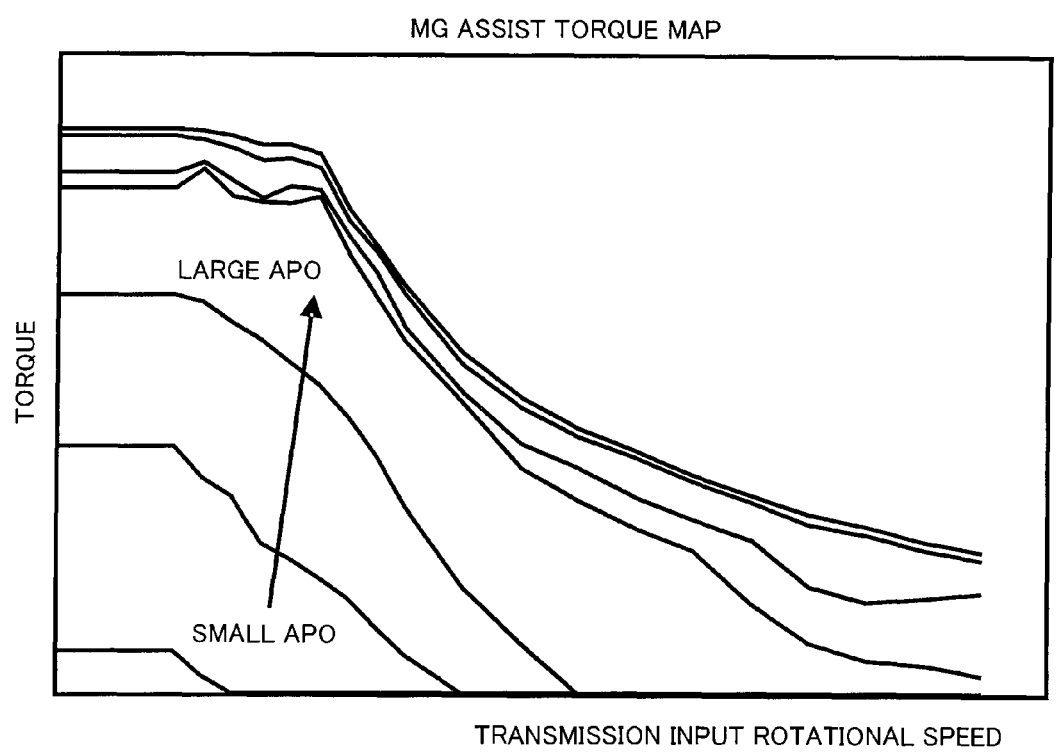
FIG. 5 is a graph illustrating a characteristic of an assist torque used when a target driving force computation unit obtains the assist torque of a motor/generator.

A target drive force computation unit 30 computes a target steady driving torque and an MG assist torque based on the accelerator pedal opening APO and the vehicle speed VSP using the target steady driving torque map of FIG. 4 and the MG assist torque map of FIG. 5.

Figure 6:
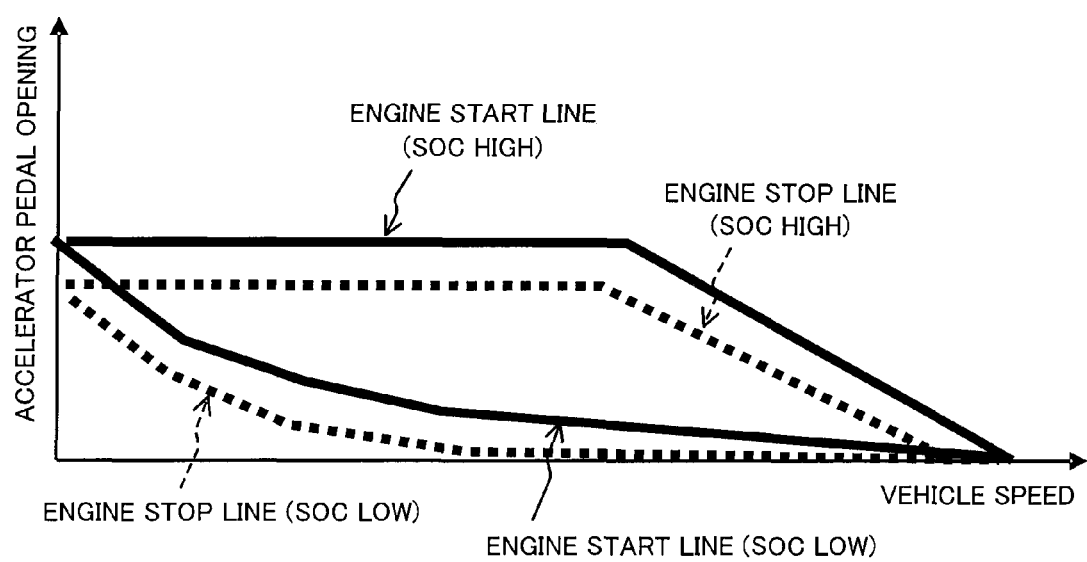
FIG. 6 is a graph illustrating an electric vehicle (EV) mode region and a hybrid electric vehicle (HEV) mode region.

A drive mode selection unit 40 determines a desired drive mode based on the accelerator pedal opening APO and the vehicle speed VSP using the EV-HEV region map of FIG. 6. As apparent from the EV-HEV region map of FIG. 6, the HEV mode is selected in a high load and a high vehicle speed, and the EV mode is selected in a low load and a low vehicle speed. In addition, the drive mode selection unit 40 performs mode switching from the EV mode to the HEV mode which causes the start of the engine 1, when the operational point defined as a combination of the accelerator pedal opening APO and the vehicle speed VSP exceeds the EV→HEV switching line and enters the HEV region during the EV mode. Furthermore, the engine 1 stops in the HEV mode, and mode switching to the EV mode in which the engine 1 is separated is performed when the operational point exceeds the HEV→EV switching line and enters the EV region during the HEV mode. The engine start/stop line is set to fall down to decrease the accelerator pedal opening APO as the battery capacity SOC is lowered.

The process of starting the engine 1 is executed when the accelerator pedal opening APO exceeds the engine start line of FIG. 6 in the EV mode. That is, the torque capacity of the second clutch 7 is controlled such that the second clutch 7 slips in a half-clutch state. The engagement of the first clutch 6 starts to increase the engine rotation after it is determined that the second clutch 7 starts to slip. As the engine rotation reaches a rotational speed at which the first combustion can be made, the engine 1 starts, and the first clutch 6 is completely engaged when the motor/generator rotational speed is close to the engine rotational speed. Then, the second clutch 7 is locked up, and the mode switches to the HEV mode.

Figure 7:
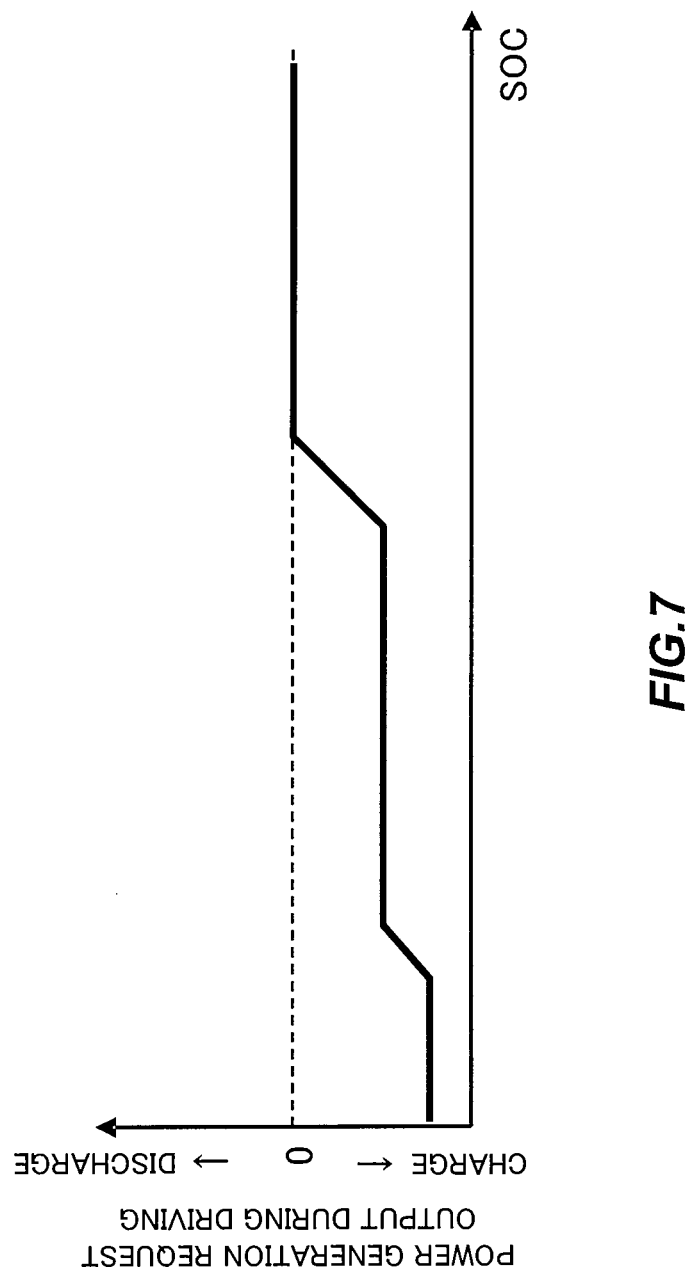
FIG. 7 is a graph illustrating a characteristic of a target charge/discharge amount against a battery charge state of a hybrid vehicle.

A target charge/discharge amount computation unit 50 of FIG. 3 computes a target charge/discharge amount (electric power) based on the battery charge state SOC using the in-travel power generating request output map of FIG. 7.

Figure 8:
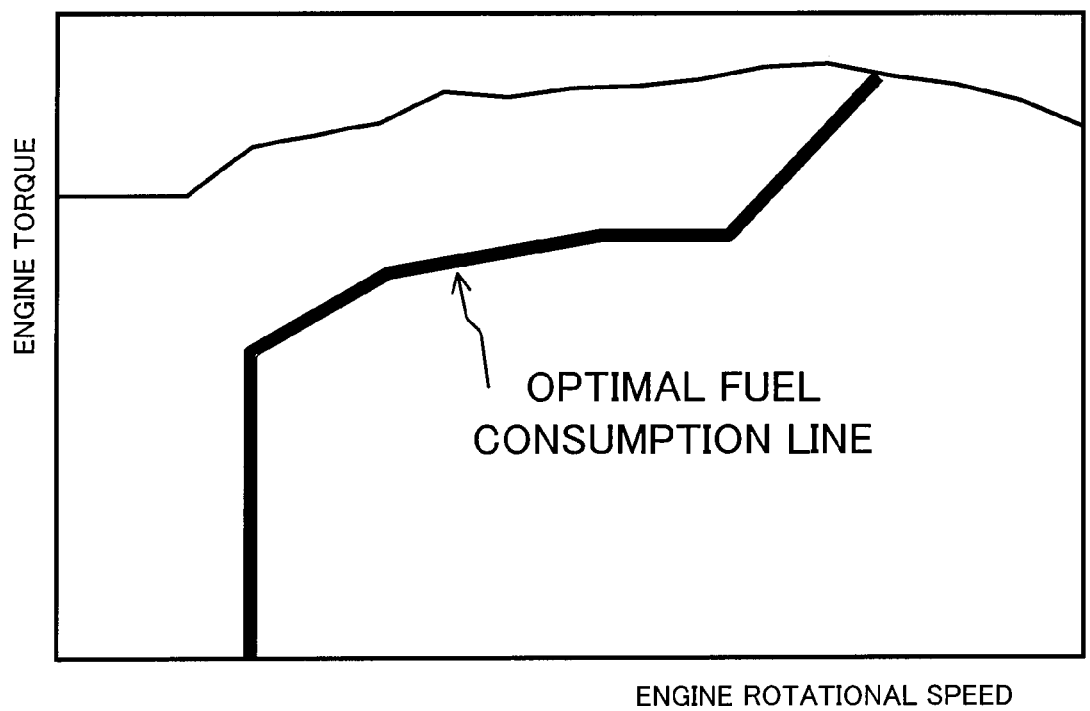
FIG. 8 is a graph illustrating an engine torque rising process for increasing an engine torque to an optimal fuel consumption line depending on a vehicle speed.

An operational point instructing unit 60 computes an attainable operational point target based on the accelerator pedal opening APO, the target steady drive torque, the MG assist torque, the target drive mode, the vehicle speed VSP, and the target charge/discharge power. That is, the operational point instructing unit 60 computes a momentary transient target engine torque, a target motor/generator torque, a target solenoid current corresponding to the target transfer torque capacity of the first clutch 6, a target transfer torque capacity of the second clutch 7, and a target gearshift position. In addition, the operational point instructing unit 60 computes the output power necessary to increase the engine torque to the optimal fuel consumption line of FIG. 8 from the current operational point, compares the necessary output power with the target charge/discharge amount (electric power) described above, and adds the smaller one as desired output power to the engine output power.

Figure 9:
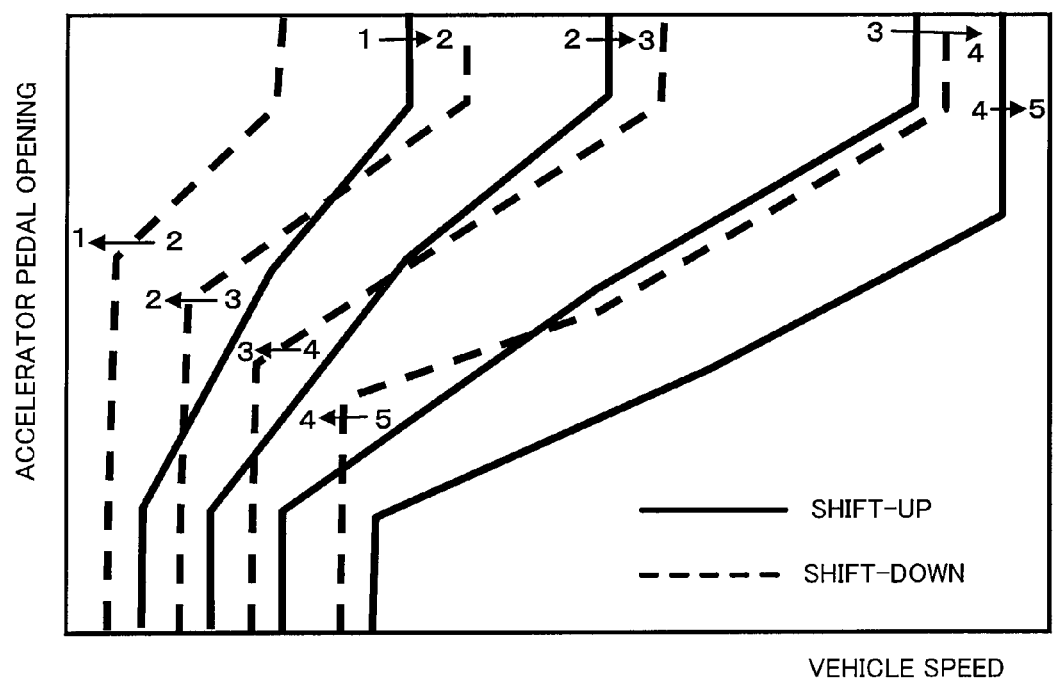
FIG. 9 is a graph illustrating a transmission characteristic for setting a transmission gear ratio of a transmission using a transmission control unit.

A transmission control unit 70 drives a corresponding solenoid valve in the automatic transmission 3 such that the target second-clutch transfer torque capacity and the target gear position are obtained based on the target second-clutch transfer torque capacity and the target gear position described above. As a result, the automatic transmission 3 is controlled to provide a power transfer state to select a target gear position while the second clutch 7 is engaged and controlled to achieve the target second-clutch transfer torque capacity. In the gearshift map of FIG. 9, the solid line indicates an up-shift line, and the dotted line indicates a down-shift line. In addition, what the next gear position is from the current gear position is determined based on the vehicle speed and the accelerator pedal opening APO. If there is a gearshift request, the transmission clutch is controlled to perform the gearshift.

Figure 10:
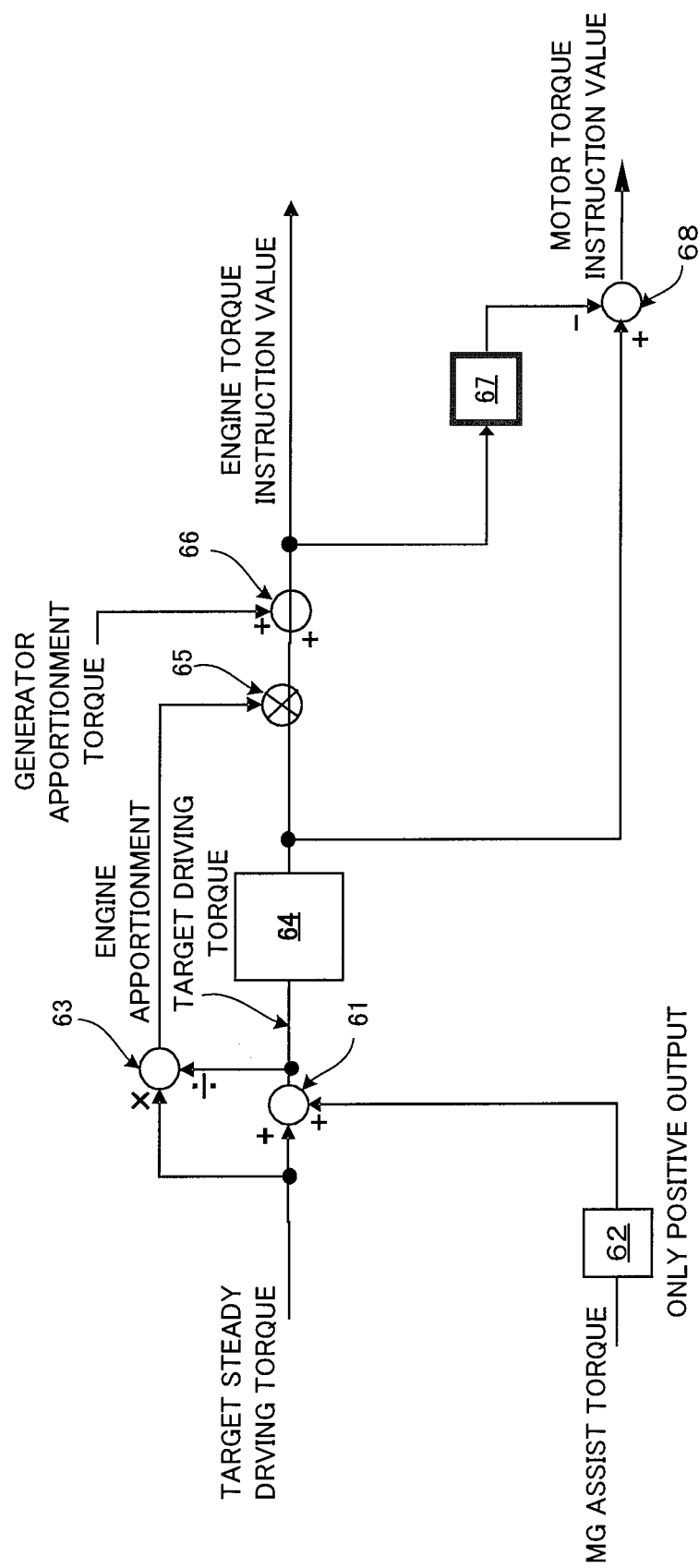
FIG. 10 is a functional block diagram illustrating an operational point instructing unit for computing an engine torque instruction value and an motor/generator torque instruction value.

FIG. 10 is a functional block diagram illustrating the operational point instructing unit 60 configured to compute the engine torque instruction value and the motor/generator torque instruction value.

An adder 61 adds a target steady driving torque and a positive torque portion of the target motor assist torque passing through a positive torque filter 62 to compute the target driving torque.

A divider 63 divides the target steady driving torque by the target driving torque to compute an engine apportionment for the driving torque.

A rate limiter 64 limits a change rate of the target driving torque per unit time, and the resulting target driving torque is multiplied by the engine apportionment using a multiplier 65. Then, an adder 66 adds a generator apportionment torque thereto to compute the engine torque instruction value.

The engine torque instruction value is output to the engine controller 21 and the engine torque estimation unit 67. The engine controller 21 controls the engine 1 such that the engine torque becomes the target engine torque. The engine torque estimation unit 67 computes the engine torque estimation value depending on the transient characteristic of the engine 1.

A subtractor 68 subtracts the engine torque estimation value of the engine torque estimation unit 67 from the target driving torque whose change rate per unit time is limited by the rate limiter 64 to compute a motor torque instruction value. The motor torque instruction value is output to the motor/generator controller 22.

The motor/generator controller 22 controls the motor/generator 5 through the battery 9 and the inverter 10 such that the torque of the motor/generator 5 becomes the target motor/generator torque.

Figure 11:
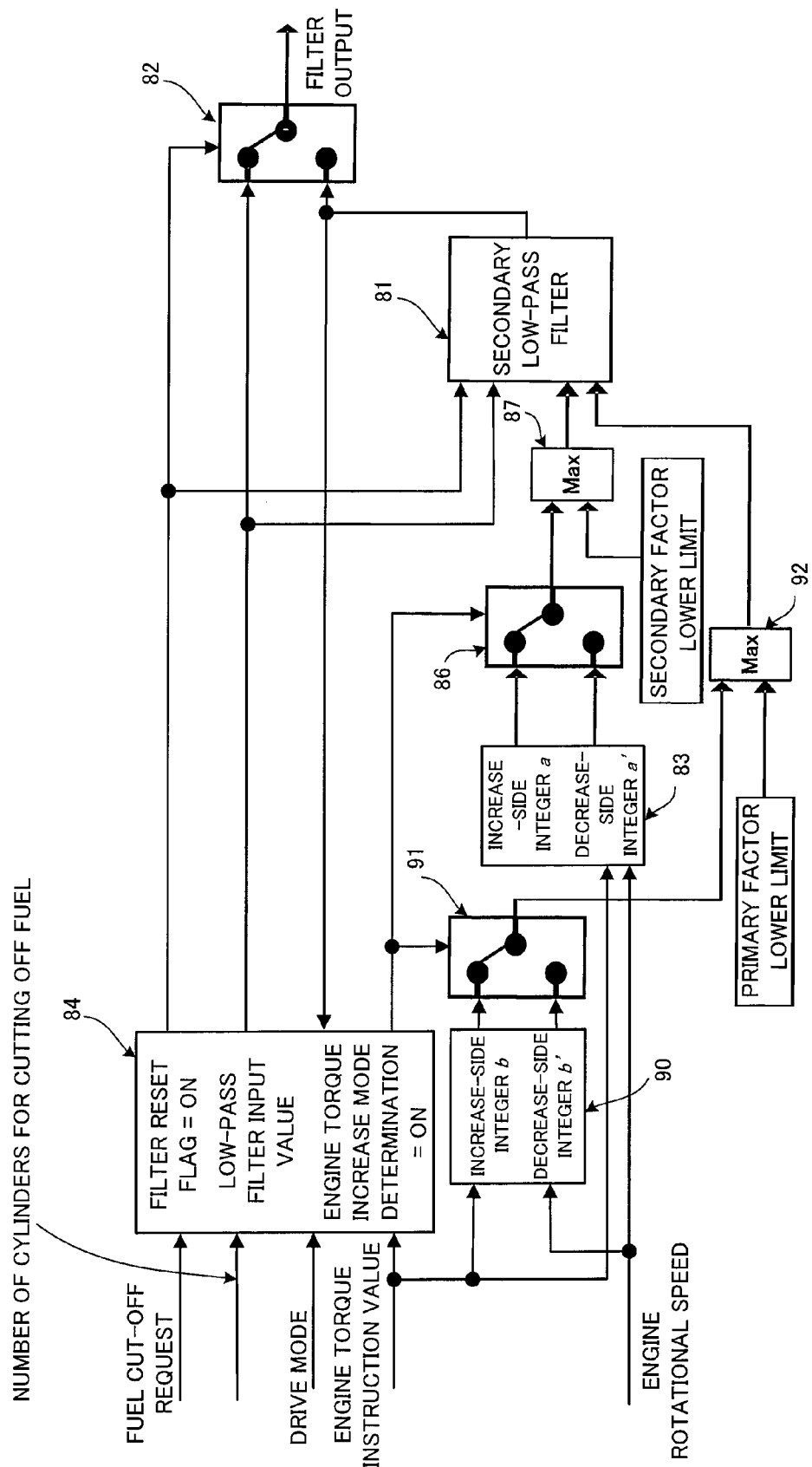
FIG. 11 is a functional block diagram illustrating an engine torque estimation unit.

FIG. 11 is a functional block diagram illustrating an engine torque estimation unit. The engine torque estimation unit 67 includes a secondary low-pass filter 81, a switch 82, and a computing unit 84 as illustrated in FIG. 11. The second low-pass filter 81 computes an engine torque estimation value based on a low-pass filter input value obtained from the engine torque instruction value. The switch 82 performs switching between the computed engine torque estimation value and the engine torque instruction value and outputs any one of them in response to the reset signal. The computing unit 84 generates the low-pass filter input value, the reset signal, and the engine torque increase mode determination signal.

The secondary low-pass filter 81 has a characteristic between the input and output values as expressed in Equation (1).

$$G(s)=\omega^2/(S^2+\zeta\Omega S+\omega^2)=1/\{(1/\omega 2)S^2+(2\zeta/\omega)S+1\} \quad (1),$$

where "^" denotes a square operation.

If "$1/\omega^2$" is set to a secondary factor "a", and "$2\zeta/\omega$" is set to a primary factor "b" in the equation (1), the equation (1) represents a secondary delay filter having the following relationship expressed as Equation (2).

$$G(s)=1/\{aS^2+bS+1\} \quad (2)$$

In Equation (2), the secondary factor a and the primary factor b are variable depending on the engine rotational speed and the engine torque instruction value. For this reason, the engine torque estimation unit 67 includes a secondary factor setting unit 83 configured to set the secondary factor a and a primary factor setting unit 90 configured to set the primary factor b.

The secondary factor setting unit 83 has an increase-side factor a selected when the engine torque instruction value increases and a decrease-side factor a' selected when the engine torque instruction value decreases. Any one of the increase-side factor a and the decrease-side factor a' is selected by a retardation factor switch (retardation factor selection unit) 86 configured to switchably operate based on the engine torque increase-mode determination signal, and is input to a select-high switch 87. The select-high switch 87 also receives a lower limit value of the secondary factor of the secondary low-pass filter 81 to compare the lower limit value of the secondary factor with the increase-side factor a or the decrease-side factor a' input through the other side. Then, the higher secondary factor is input to the secondary low-pass filter 81.

Similarly, the primary factor setting unit 90 has an increase-side factor b selected when the engine torque instruction value increases and a decrease-side factor b' selected when the engine torque instruction value decreases. Any one of the increase-side factor b and the decrease-side factor b' is selected by the switch 91 configured to switchably operate based on the engine torque increase-mode determination signal, and is input to a select-high switch 92. The select-high switch 92 also receives a lower limit value of the primary factor of the secondary low-pass filter 81 to compare the lower limit value of the primary factor and the increase-side factor b or the decrease-side factor b' input through the other side. Then, the higher primary factor is input to the secondary low-pass filter 81.

The increase-side factors a and a' selected when the engine torque instruction value increases and the decrease-side factors b and b' selected when the engine torque instruction value decreases described above are set in advance and stored as illustrated in FIGS. 12A to 12D. That is, FIG. 12A illustrates an example of setting the increase-side secondary factor a, FIG. 12B illustrates an example of setting the increase-side primary factor b, FIG. 12C illustrates an example of setting the decrease-side secondary factor a', and FIG. 12D illustrates an example of setting the decrease-side primary factor b'. A retardation degree of the secondary low-pass filter 81 increases as each set factor increases. Meanwhile, the retardation degree of the secondary low-pass filter 81 decreases as each setting factor decreases. Each set retardation factor is set to be variable depending on the engine rotational speed and the engine torque instruction value. Therefore, the retardation degree of the secondary low-pass filter 81 is set to decrease as the engine rotational speed increases, or the engine torque instruction value increases over a predetermined torque.

That is, the response time of the engine torque becomes fast as the engine rotational speed increases. In addition, the response after the engine recovery is fast, and the response is slow in a low torque range. Then, the response becomes fast in a high torque range. By setting the retardation factor to match such a response characteristic, it is possible to improve estimation accuracy of the engine torque estimation value.

Figure 13:
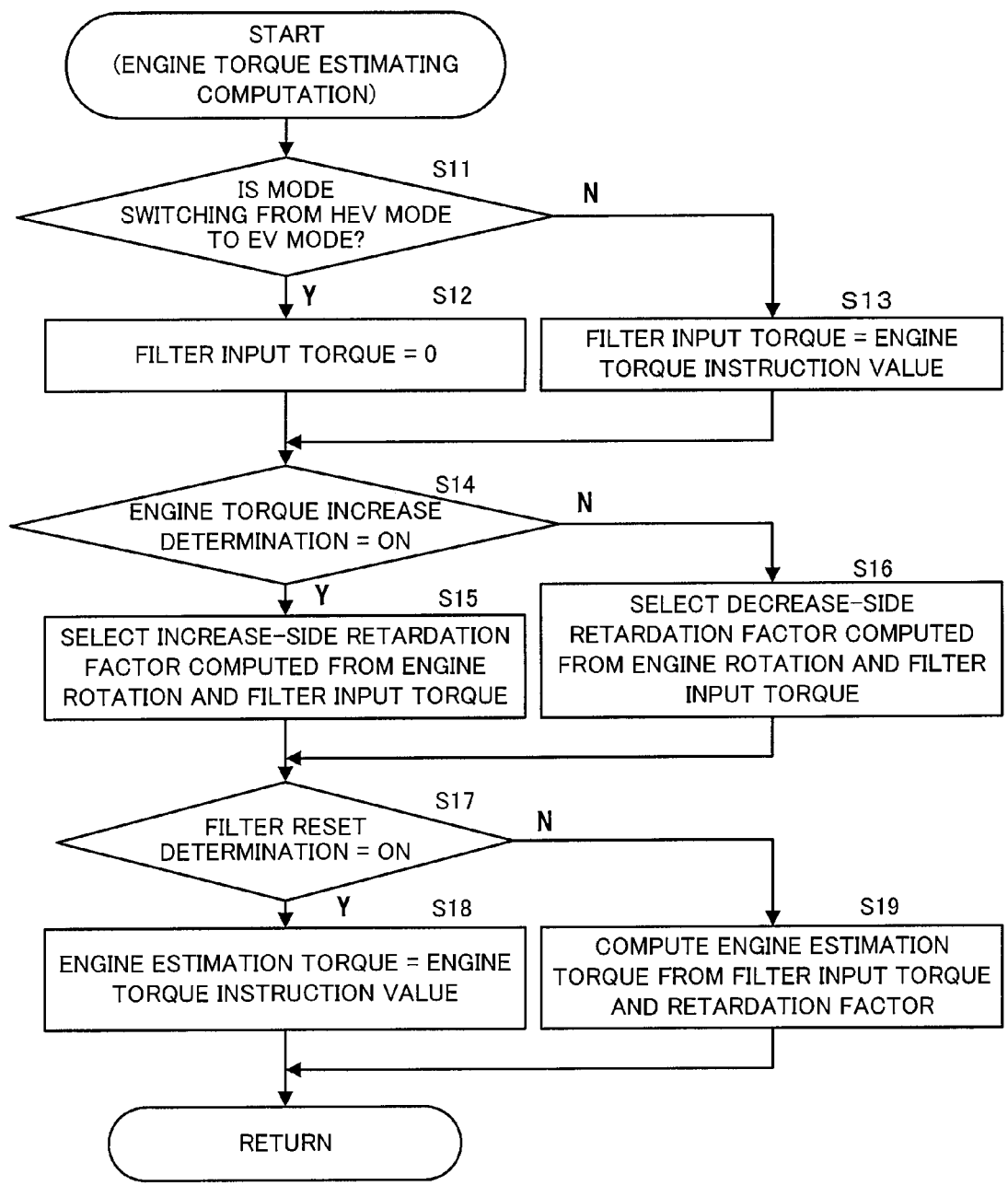
FIG. 13 is a flowchart for controlling an engine torque estimation computation.
Figure 14:
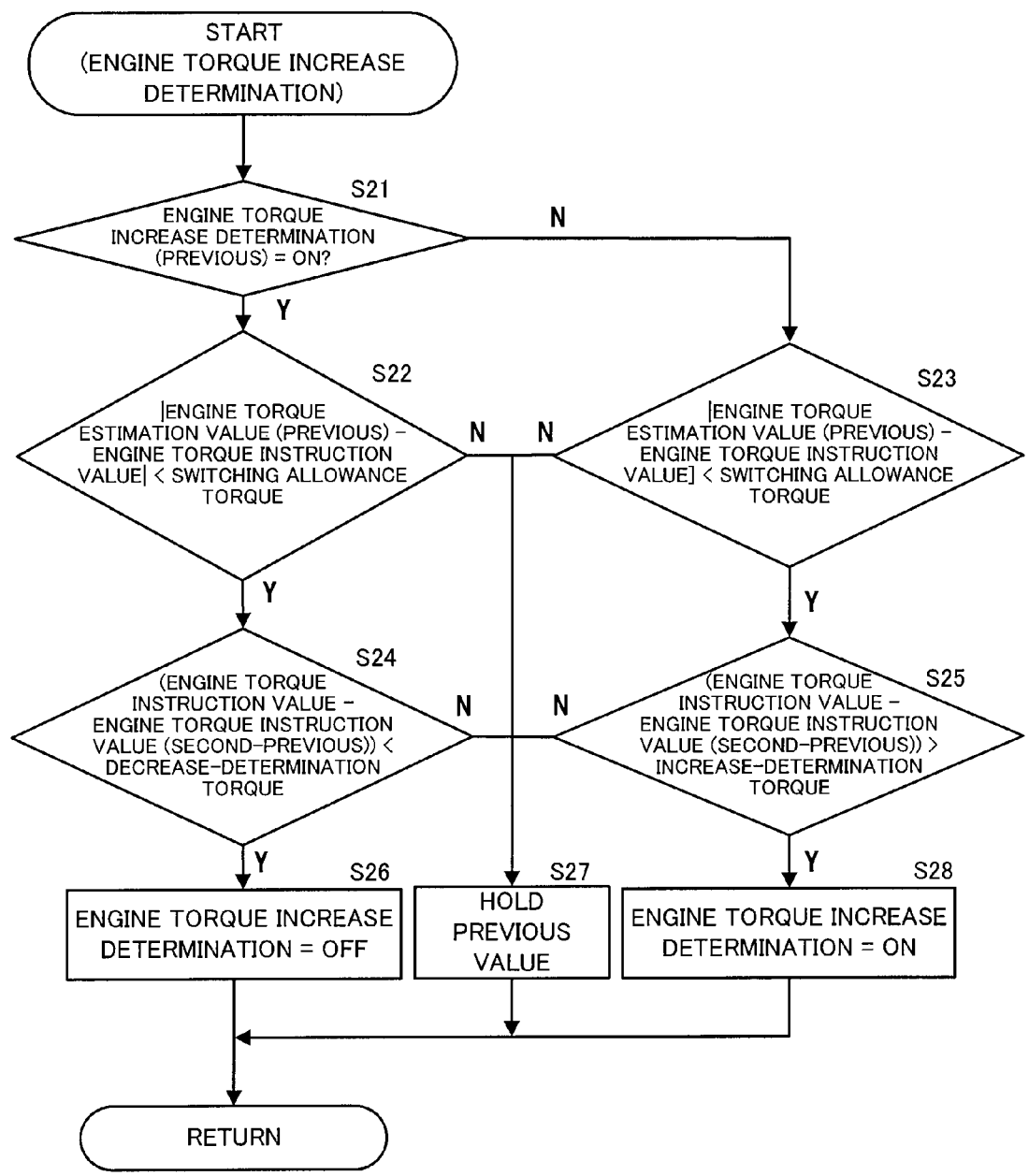
FIG. 14 is a flowchart illustrating a subroutine for an engine torque increase determination.
Figure 15:
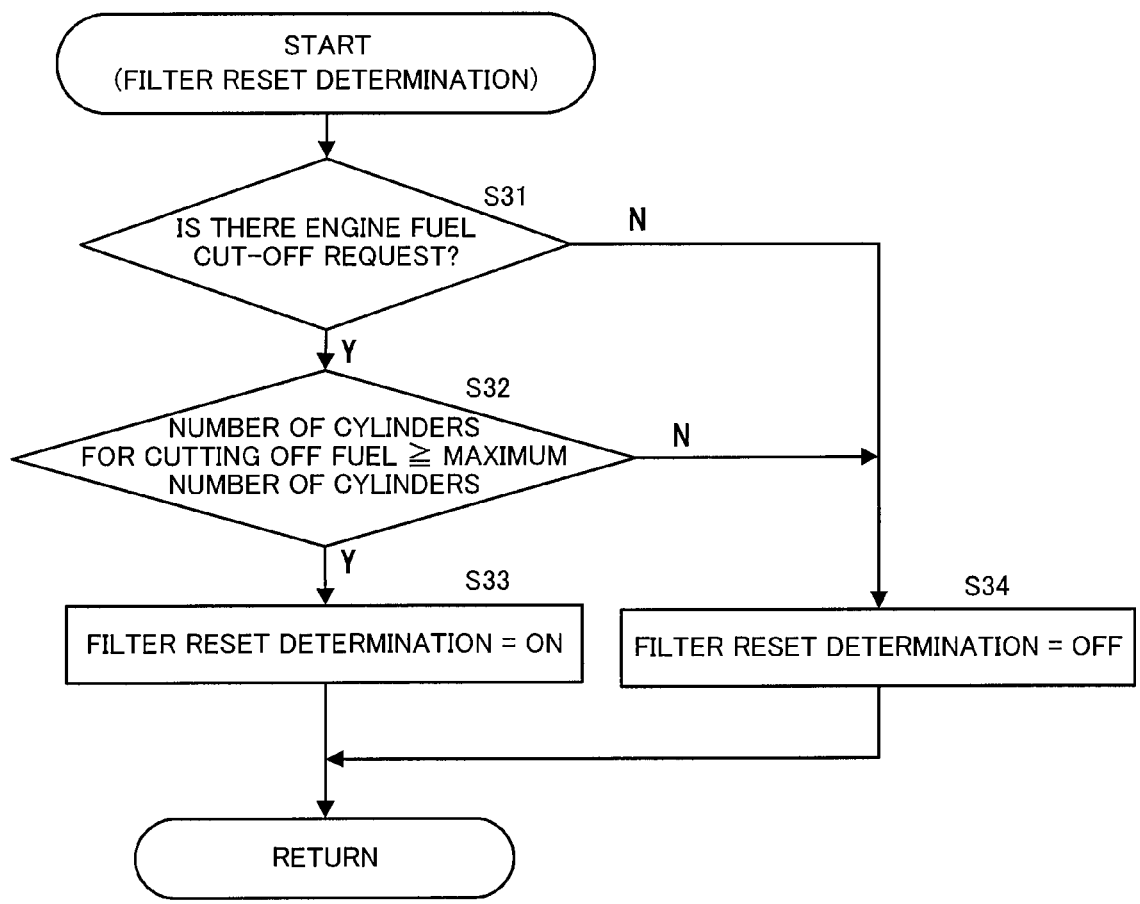
FIG. 15 is a flowchart illustrating a subroutine for a filter reset determination.

The engine torque estimation unit 67 having the configuration described above operates based on the control flowchart for an engine torque estimation computation of FIG. 13 executed using the computing unit 84. FIG. 14 illustrates a subroutine for the engine torque increase determination using the computing unit 84. FIG. 15 illustrates a subroutine for the filter reset determination using the computing unit 84.

First, in step S11, it is determined whether or not a vehicle drive mode switches from the HEV mode to the EV mode. If it is determined that the mode switches to the EV mode, the engine torque instruction value decreases to a zero torque. Therefore, in step S12, the filter input torque (engine torque instruction value) is set to zero. Meanwhile, if it is determined that the mode does not switch to the EV mode in step S11, the engine torque changes in response to the engine torque instruction value. Therefore, the process advances to step S13, so that the filter input torque is set to the engine torque instruction value.

Subsequently, in step S14, it is determined whether or not the engine torque increase determination is ON (whether or not the torque increases). The engine torque increase determination is executed through the subroutine of FIG. 14.

In step S21 of FIG. 14, it is determined whether or not the previous engine torque increase determination is ON (the torque increases). If the previous engine torque increase determination is ON (torque increases), the process advances to step S22. If the previous engine torque increase determination is OFF (torque decreases), the process advances to step S23.

In step S22, it is determined whether or not an absolute value of the difference between the previous engine torque estimation value determined as the torque increases and the current engine torque instruction value is smaller than a predetermined switching allowance torque. If it is determined that the difference between the previous engine torque estimation value and the current engine torque instruction value is equal to or greater than the allowance torque, the process advances to step S27, so that the torque increase determination is held at the previous value. If it is determined that the aforementioned difference is smaller than the allowance torque, the process advances to step S24.

That is, in a case where the engine torque increase determination is ON, first, the process advances to step S24 only if the difference between engine torque estimation value (previous value) in step S22 and the engine torque instruction value (current value) is smaller than a predetermined switching allowance torque. Otherwise, the process advances to step S27. The switching allowance torque is a predetermined threshold value for determining that the difference between the engine torque instruction value and the engine torque estimation value decreases.

In step S24, it is determined whether or not the difference torque instruction value obtained by subtracting the second-previous engine torque instruction value from the current engine torque instruction value is equal to or smaller than a predetermined decrease-determination torque. The decrease-determination torque is a threshold value for determining that the engine torque instruction value apparently decreases. Here, it is determined whether or not the change of the engine torque instruction value from the second-previous one is equal to or smaller than the predetermined decrease-determination torque. If it is determined that the difference torque instruction value is equal to or greater than the decrease-determination torque, the process advances to step S27, so that the torque increase determination is held at the previous value. If it is determined that the difference torque instruction value is smaller than the decrease-determination torque, the process advances to step S26, so that engine torque increase determination is set to OFF (torque decreases).

That is, in a case where the engine torque increase determination is ON, the engine torque increase determination is set to switch from ON to OFF if conditions of both the determination on the difference between the engine torque instruction value and the previous engine torque estimation value in step S22 and the determination on the difference between the engine torque instruction value and the second-previous engine torque instruction value in step S24 are satisfied. Therefore, the engine torque increase determination is held as ON unless both the conditions are satisfied.

In step S23, it is determined whether or not an absolute value of the difference between the previous engine torque estimation value determined as the torque decreases and the current engine torque instruction value is smaller than a predetermined switching allowance torque. If it is determined that the difference between the previous engine torque estimation value and the current engine torque instruction value is equal to or greater than the allowance torque, the process advances to step S27, so that the torque increase determination is held at the previous value. If the aforementioned difference is smaller than the allowance torque, the process advances to step S25.

That is, in a case where the engine torque increase determination is OFF, first, the process advances to step S25 only if the difference between the engine torque estimation value (previous value) in step S23 and the engine torque instruction value (current value) is smaller than a predetermined switching allowance torque. Otherwise, the process advances to step S27.

In step S25, it is determined whether or not the difference torque instruction value obtained by subtracting the second-previous engine torque instruction value from the current engine torque instruction value exceeds a predetermined increase-determination torque. If the difference torque instruction value is smaller than the increase-determination torque, the process advances to step S27, so that the torque increase determination is held at the previous value. If the difference torque instruction value is equal to or greater than the increase-determination torque, the process advances to step S28, so that the engine torque increase determination is set to ON (torque increases).

That is, in a case where the engine torque increase determination is OFF, the engine torque increase determination is set to switch from OFF to ON if conditions of both the determination on the difference between the engine torque instruction value and the previous engine torque estimation value in step S23 and the determination on the difference between the engine torque instruction value and the second-previous engine torque instruction value in step S25 are satisfied. Therefore, unless both the conditions are satisfied, the engine torque increase determination is held as OFF.

Returning to FIG. 13, in a case where the engine torque increase determination in step S14 is ON (torque increases), the process advances to step S15, so that the retardation factor switches 86 and 91 switch to the increase-side in FIG. 11. As a result, the increase-side retardation factors a and b computed from the engine rotational speed and the filter input torque are input to the secondary low-pass filter 81. In addition, in a case where the engine torque increase determination in step S14 is OFF (torque decreases), the process advances to step S16, so that the retardation factor switches 86 and 91 switch to the decrease-side in FIG. 11. As a result, the decrease-side retardation factors a' and b' computed from the engine rotational speed and the filter input torque are input to the secondary low-pass filter 81.

In step S17, it is determined whether or not the filter reset determination is ON. The filter reset determination is executed through the subroutine of FIG. 15.

In step S31 of FIG. 15, it is determined whether or not there is an engine fuel cut-off request. If there is an engine fuel cut-off request, the process advances to step S32. Meanwhile, if there is no engine fuel cut-off request, the process advances to step S34, so that the filter reset determination is set to OFF.

In step S32, it is determined whether or not the number of cylinders for cutting off an engine fuel is equal to or greater than the maximum number of cylinders. The maximum number of cylinders in this case refers to the number of cylinders of the engine 1. If an engine has six cylinders, the maximum number of cylinders is set to 6. If an engine has four cylinders, maximum number of cylinders is set to 4. If the number of cylinders for cutting off a fuel is equal to or greater than the maximum number of cylinders, the process advances to step S33, so that the filter reset determination is set to ON. If the number of cylinders for cutting off a fuel is smaller than the maximum number of cylinders (in a state that combustion is held even in a single cylinder), the process advances to step S34, so that the filter reset determination is set to OFF.

Returning to FIG. 13, if the filter reset determination in step S17 is ON (the number of cylinders for cutting off a fuel is equal to or greater than the maximum number of cylinders), the process advances to step S18, so that the switch 82 of FIG. 11 is operated to set the engine torque estimation value to the engine torque instruction value. That is, the delay filter is disabled. Meanwhile, if the filter reset determination in step S17 is OFF, that is, if there is no fuel cut-off request, or if the number of cylinders for cutting off a fuel is smaller than the maximum number of cylinders, the process advances to step S19, so that the engine torque estimation value is computed based on the engine torque instruction value and the input retardation factors a and b or a' and b'.

An exemplary operation of the engine torque estimation unit 67 will be described with reference to the timing charts of FIGS. 16 to 18 and 19. FIG. 19 illustrates a comparative example. The timing charts of FIGS. 16, 17, and 19 illustrate a change of the engine torque increase determination and the engine torque estimation value when the engine torque instruction value changes from a positive torque to a negative torque at timings t1, t11, and t31, and when the engine torque instruction value changes from a negative torque to a positive torque at timings t3, t13, and t33.

FIG. 19 illustrates a comparative example in which the engine torque increase determination changes between ON and OFF depending on a fluctuation equal to or greater than a predetermined torque of the engine torque instruction value.

In this comparative example, the engine torque increase determination changes between ON and OFF depending on a fluctuation equal to or greater than a predetermined torque of the engine torque instruction value. For this reason, while the engine torque estimation value decreases along with a secondary retardation, the engine torque increase determination becomes ON. Therefore, the engine torque estimation value oscillates up and down as indicated by the dotted line. That is, if the engine torque instruction value increases while there is a difference between the engine torque estimation value and the engine torque instruction value, the engine 1 reduces the torque in practice even when the retardation factor tending to increase the torque is used. Therefore, responsiveness is still in the decrease side, and the engine torque estimation accuracy does not improve.

Figure 16:
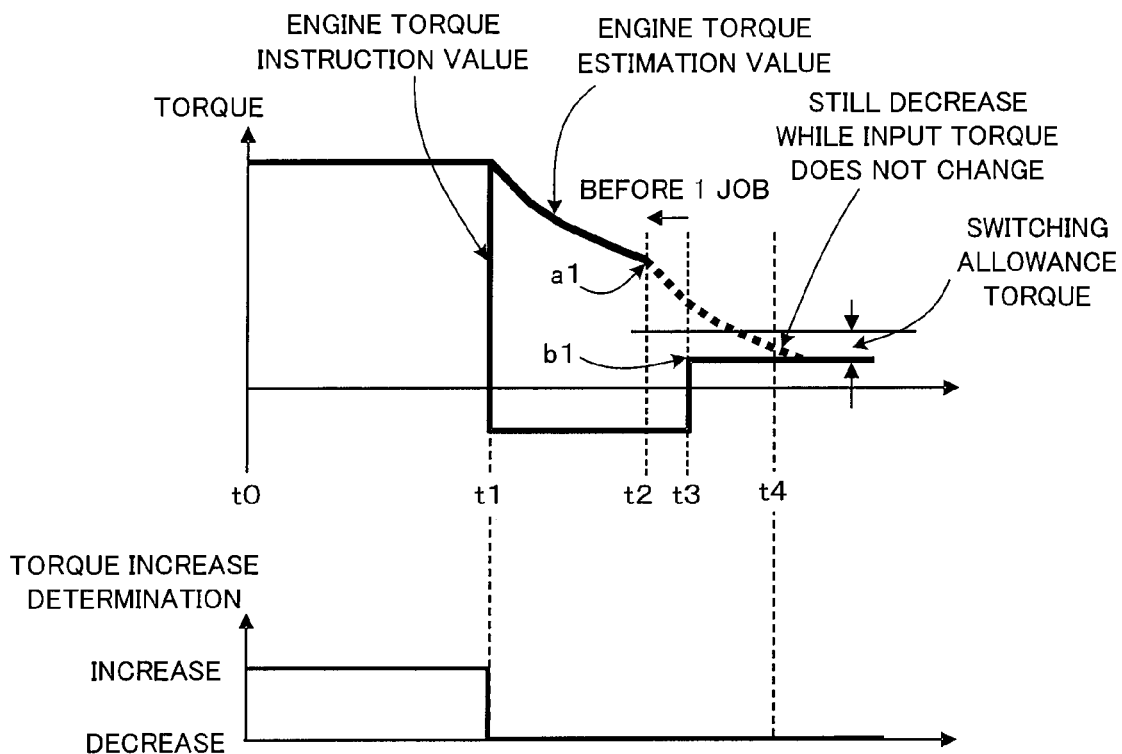
FIG. 16 is a timing chart illustrating Operational Example 1 of an engine torque estimation means.
Figure 17:
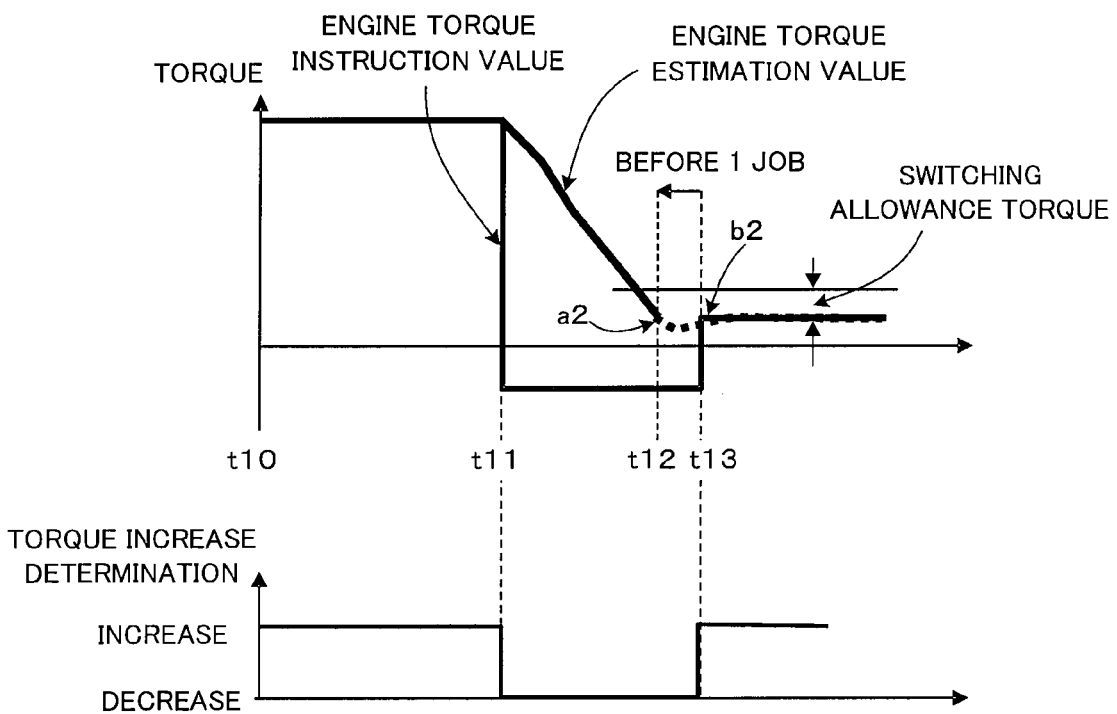
FIG. 17 is a timing chart illustrating Operational Example 2 of an engine torque estimation means.

In contrast, according to the present embodiment, in the timing chart of FIG. 16, the engine torque estimation value decreases along with a secondary retardation as the engine torque instruction value changes from a positive torque to a negative torque at timing t1. In addition, the determination on whether or not the difference between the engine torque instruction value (current value) and the engine torque estimation value (previous value) in step S22 is equal to or smaller than a predetermined switching allowance torque is satisfied. Furthermore, the difference from the second-previous engine torque instruction value in step S24 becomes equal to or smaller than the decrease-determination torque. For this reason, the engine torque increase determination changes from ON to OFF at timing t1.

In a case where the engine torque instruction value changes from a negative torque to a positive torque at timing t3, a difference between the engine torque estimation value (point a1 of the previous value) and the engine torque instruction value (point b1) exceeds the switching allowance torque. For this reason, the determination in step S23 is not satisfied, and the engine torque increase determination is held at the previous value (OFF) in step S27.

The engine torque estimation value converges to the engine torque instruction value after timing t4. However, after timing t4, although the determination in step S23 is satisfied, the difference from the second-previous engine torque instruction value becomes zero, and is equal to or smaller than the increase-determination torque. For this reason, the determination in step S25 is not satisfied, and the engine torque increase determination is held as OFF.

In the timing chart of FIG. 17, as the engine torque instruction value changes from the positive torque to the negative torque at timing t11, the engine torque estimation value decreases along with the secondary retardation. In addition, it is determined that the difference between the engine torque instruction value (current value) and the engine torque estimation value (previous value) in step S22 is equal to or smaller than the predetermined switching allowance torque. Furthermore, the difference from the second-previous engine torque instruction value in step S24 is equal to or smaller than the decrease-determination torque. For this reason, the engine torque increase determination changes from ON to OFF at timing t11.

In a case where the engine torque instruction value changes from a negative torque to a positive torque at timing t13, the difference between the engine torque estimation value (point a2 of previous value) and the engine torque instruction value (point b2) is equal to or smaller than the switching allowance torque. Therefore, it is determined YES in step S23. In addition, since the difference between the engine torque instruction value and the second-previous engine torque instruction value exceeds the increase-determination torque, it is also determined YES in step S25. For this reason, the engine torque increase determination changes from OFF to ON at timing t13.

As described above, after the engine torque estimation value approaches the engine torque instruction value, the engine torque increase determination changes to the increase side. Therefore, it is possible to estimate the engine torque based on an actual engine torque response.

Figure 18:
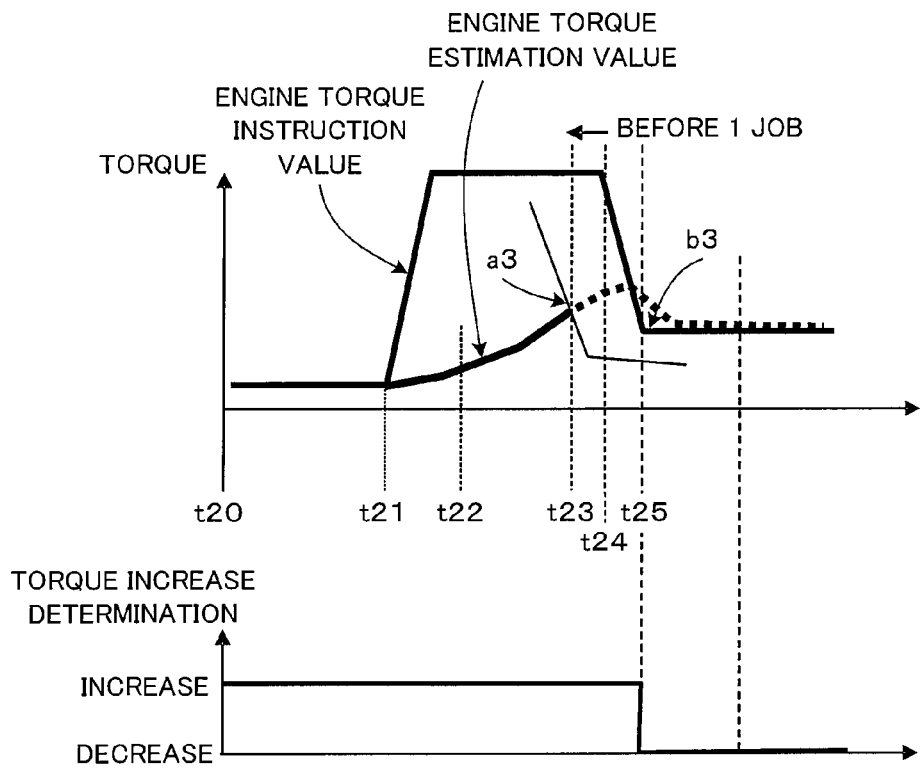
FIG. 18 is a timing chart illustrating Operational Example 3 of an engine torque estimation means.
Figure 19:
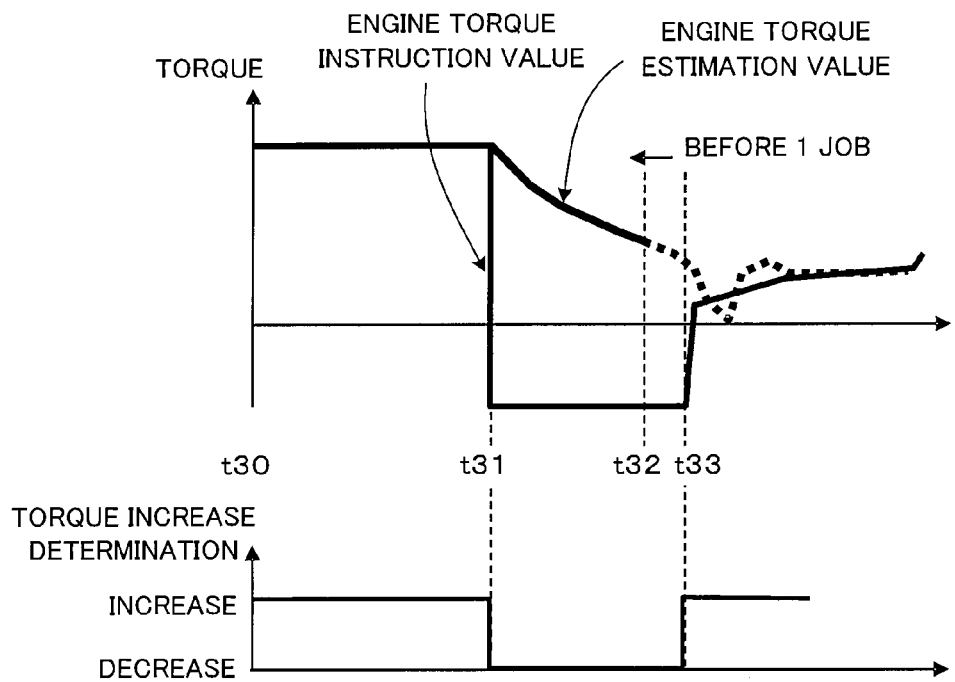
FIG. 19 is a timing chart illustrating Comparative Operational Example of an engine torque estimation means.

The timing chart of FIG. 18 illustrates a change of the engine torque increase determination and the engine torque estimation value when the engine torque instruction value increases at timing t21 and changes to decrease at timing t24.

At timing t21, the engine torque estimation value increases along with a secondary retardation as the engine torque instruction value increases. In addition, as the engine torque instruction value decreases between timings t24 and t25, the difference between the engine torque estimation value (point a3 of the previous value) and the engine torque instruction value (point b3) is equal to or smaller than the switching allowance torque at timing t25. Therefore, the determination at timing S22 is satisfied. Furthermore, since the difference between the engine torque instruction value (point b3) and the second-previous engine torque instruction value exceeds the decrease-determination torque, the determination in step S24 is also satisfied. For this reason, the engine torque increase determination changes from ON to OFF at timing t25. Accordingly, the engine torque estimation value after timing t24 is computed based on the decrease-side retardation factor and slowly converges to the engine torque instruction value.

As described above, since the engine torque increase determination changes to the increase side after the engine torque estimation value approaches the engine torque instruction value, it is possible to estimate the engine torque based on an actual engine torque response.

As described above, since it is possible to estimate the engine torque with high accuracy, it is possible to improve accuracy of the motor/generator torque for compensating for the engine torque. Therefore, it is possible to transiently achieve a driver request driving force and perform rapid acceleration/deceleration.

According to the present embodiment, the following effects can be obtained.

(A) There is provided a means configured to estimate the engine torque by compensating for a retardation caused by the delay filter 81 for the engine torque instruction value. The retardation factor indicating the retardation degree of the delay filter 81 includes the increase-side retardation factors a and b for a case where the engine torque instruction value increases and the decrease-side retardation factors a' and b' for a case where the engine torque instruction value decreases. In addition, switching between the increase-side retardation factor and the decrease-side retardation factor is performed when the difference between the engine torque instruction value as a filter input value and the engine torque estimation value is equal to or smaller than a predetermined value, and a change of the engine torque instruction value exceeds a predetermined increase-determination torque or is smaller than the decrease-determination torque.

That is, the engine torque estimation value approaches the engine torque instruction value, and then, switching between the increase-side retardation factor and the decrease-side retardation factor is performed. Therefore, it is possible to estimate the engine torque based on an actual engine torque response and improve accuracy of the engine torque estimation value. As a result, it is possible to improve control accuracy of a vehicle driving torque.

(B) The increase-side retardation factor and the decrease-side retardation factor of the delay filter are set depending on the engine rotational speed and the engine torque instruction value, and the retardation degree is set to decrease as the engine rotational speed increases, and the engine torque instruction value increases.

That is, the engine torque response becomes fast as the engine rotational speed increases. In addition, the response after engine recovery is fast. Then, the response becomes slow in the low torque range and becomes fast in the high torque range. If the retardation factor is set to match such a response characteristic, it is possible to improve estimation accuracy of the engine torque estimation value.

(C) The delay filter is disabled when the engine 1 advances to the fuel cut-off mode. That is, the engine torque changes stepwise when the engine 1 enters the fuel cut-off mode. Therefore, by disabling the delay filter, it is possible to improve estimation accuracy of the engine torque.

(D) The engine torque instruction value input to the delay filter is set to a zero torque while the mode switches to the electric vehicle mode from the hybrid electric vehicle mode in response to the fuel cut-off request to the engine 1. After the mode switches to the electric vehicle mode, the engine torque instruction value is set to the fuel cut-off torque.

That is, when the mode switches from the HEV mode to the EV mode, the engine 1 performs an idle operation, and then, the mode switches to the engine fuel cut-off mode of the EV mode. For this reason, by setting the input value of the delay filter to zero when the mode switches from the HEV mode to the EV mode, it is possible to improve engine torque estimation accuracy.

(E) The delay filter is configured as a secondary delay filter. For this reason, it is possible to more improve the accuracy of the engine estimation torque.

While the invention has been described with reference to certain embodiments, they are not intended to limit the invention. Instead, various modifications, alterations, and changes may be possible without departing from the spirit and scope of the invention.

This application claims priority based on JP2010-239383, filed with the Japan Patent Office on Oct. 26, 2010, the entire contents of which are incorporated into this specification by reference.

The invention claimed is:

1. A driving torque control device for a hybrid vehicle having an engine and a motor/generator as a power source and configured to select an electric vehicle mode in which the vehicle travels only using power from the motor/generator or a hybrid electric vehicle mode in which the vehicle travels using power from both the engine and the motor/generator to determine a driving force based on information corresponding to a driver request load and to perform switching between the electric vehicle mode and the hybrid electric vehicle mode, the driving torque control device comprising:

an engine torque estimation unit configured to estimate an engine torque by compensating for a retardation caused by a delay filter in an engine torque instruction value while the vehicle is traveling in the hybrid electric vehicle mode, and a retardation factor selection unit configured to select, as a retardation factor indicating a retardation degree of the delay filter, any one of an increase-side retardation factor for which the engine torque instruction value increases and a decrease-side retardation factor for which the engine torque instruction value decreases, wherein the retardation factor selection unit is configured to perform switching between the increase-side retardation factor and the decrease-side retardation factor while a difference between the engine torque estimated by the engine torque estimation unit and the engine torque instruction value as a filter input value for the delay filter is equal to or smaller than a predetermined value.

2. The driving torque control device for a hybrid vehicle according to claim 1, wherein the retardation factor selection unit is configured to perform switching between the increase-side retardation factor and the decrease-side retardation factor while a difference between the engine torque estimated by the engine torque estimation unit and the engine torque instruction value as the filter input value for the delay filter is equal to or smaller than a predetermined value, and a change of the engine torque instruction value exceeds a predetermined increase-determination torque or is smaller than a predetermined decrease-determination torque.

3. The driving torque control device for a hybrid vehicle according to claim 1, wherein the increase-side retardation factor and the decrease-side retardation factor are set depending on an engine rotational speed and an engine torque instruction value such that a retardation degree decreases as the engine rotational speed increases, and the engine torque instruction value increases.

4. The driving torque control device for a hybrid vehicle according to claim 1, wherein the delay filter is disabled when the engine advances to a fuel cut-off mode.

5. The driving torque control device for a hybrid vehicle according to claim 1, wherein the engine torque instruction value input to the delay filter is set to a zero torque while a mode switches from the hybrid electric vehicle mode to the electric vehicle mode in response to a fuel cut-off request to the engine, and the engine torque instruction value is set to a fuel cut-off torque from a start of the electric vehicle mode.

6. The driving torque control device for a hybrid vehicle according to claim 1, wherein the delay filter is a secondary delay filter.

* * * * *